A. P. ROUTT.
Mole Plow.
No 61,263.
Patented Jan. 15, 1867.
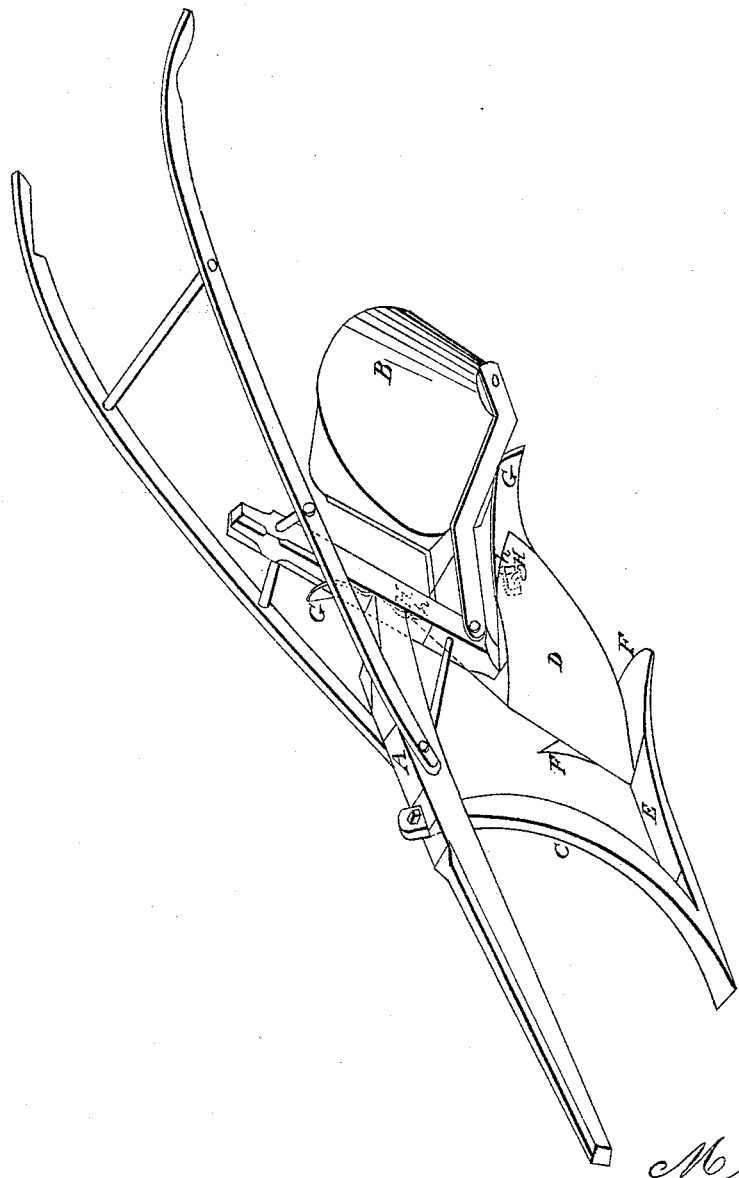
Witnesses:
Chas. D. Smith
Thomas J. Hurdle
Munn & Co
Attorneys for
Inventor:
A. P. Routt
By O Knight
Supt.

United States Patent Office.

A. P. ROUTT, OF LIBERTY MILLS, VIRGINIA.

Letters Patent No. 61,263, dated January 15, 1867.

IMPROVED DRAINING MACHINE.

*The Schedule referred to in these Letters Patent and making part of the same.*

TO ALL WHOM IT MAY CONCERN:

Be it known that I, A. P. ROUTT, of Liberty Mills, in the county of Orange, and State of Virginia, have invented a new and useful improvement in Draining Machines; and I do hereby declare the following to be a full, clear, and exact description of the same, sufficient to enable one skilled in the art to which the invention appertains to make use of it, reference being had to the accompanying drawings, which form a part of this specification, and in which my invention is represented by a perspective view.

My invention relates to an improvement in the draining plough for which Letters Patent of the United States, numbered 17,809, were granted to me on the fourteenth day of July, 1857.

The object of the present improvement is to provide means whereby a more steady and perfect operation of the plough is effected, and whereby the dirt is cleared away from the edge of the ditch to afford free access of water.

In the accompanying drawings, the parts A B C D E are constructed and arranged in the same manner as described in my aforesaid patent. F F are horizontal wings or cutters welded to the bottom bar E. The bar E connects the coulter C with the double mould-board D, and the wings F serve, by lateral penetration, to retain the plough firmly in the ground during operation. By these means a more smooth, steady, and perfect operation is obtained. G G are flaring wings which are attached to and which project above the double mould-board D, and beyond the same laterally, said wings serving to clear the dirt away from the edges of the ditch, to allow the water to freely enter. The wings G G are made adjustable vertically by means of a series of apertures in each for the accommodation of the screw-bolts H H, which are secured by the thumb-nuts h h. The wings G G may be so adjusted, by means of the bolts H, that they shall serve to cut off the edges of the ditch, as well as throw the dirt away from the same. The sides of the ditch or drain may thus be made to flare outward to any desired extent. In forming a hillside drain, one wing G may be lowered to cut off the upper edge, and the other raised to form a barrier or bank below, the screw-bolts H serving to retain the wings G in any position in which they may be adjusted.

Having described my invention, the following is what I claim as new herein, and desire to secure by Letters Patent:

I claim the adjustable flaring wings G G, applied to the double mould-board D, in the manner described, and operating to clear away the dirt from the edges of the ditch, as and for the purpose set forth.

A. P. ROUTT.

Witnesses:
    G. I. BROWNING,
    T. RIVELEY.